(12) United States Patent
Noles, Jr.

(10) Patent No.: US 9,682,354 B2
(45) Date of Patent: Jun. 20, 2017

(54) POLYMER BLENDING SYSTEM

(71) Applicant: Jerry W. Noles, Jr., Blanchard, OK (US)

(72) Inventor: Jerry W. Noles, Jr., Blanchard, OK (US)

(73) Assignee: Noles Intellectual Properties, LLC, Washington, OK (US)

(*) Notice: Subject to any disclaimer, the term of this patent is extended or adjusted under 35 U.S.C. 154(b) by 49 days.

(21) Appl. No.: 14/528,648

(22) Filed: Oct. 30, 2014

(65) Prior Publication Data

US 2015/0055432 A1 Feb. 26, 2015

Related U.S. Application Data

(63) Continuation of application No. 13/216,329, filed on Aug. 24, 2011, now Pat. No. 8,905,627, and a (Continued)

(51) Int. Cl.
*B28C 5/06* (2006.01)
*B01F 15/02* (2006.01)
(Continued)

(52) U.S. Cl.
CPC ........ *B01F 15/0479* (2013.01); *B01F 3/0865* (2013.01); *B01F 5/061* (2013.01);
(Continued)

(58) Field of Classification Search
CPC ............ B01F 5/0682; B01F 2215/0049; B01F 15/0479; B29K 2105/0073
(Continued)

(56) References Cited

U.S. PATENT DOCUMENTS 2,567,479 A 9/1951 Hebard
3,159,577 A 12/1964 Ambrose et al.
(Continued)

FOREIGN PATENT DOCUMENTS

EP 0473356 7/1995
EP 0473356 B1 * 7/1995 .............. B01F 3/088
(Continued)

OTHER PUBLICATIONS

Examination Report and Translation for Qatari Patent Application No. QA/201305/00097 Jul. 9, 2015.
(Continued)

*Primary Examiner* — Tony G. Soohoo
*Assistant Examiner* — Anshu Bhatia
(74) *Attorney, Agent, or Firm* — Tumey L.L.P.

(57) ABSTRACT

A system for blending polymers and other chemicals in an aqueous liquid is provided. Static mixers and tubes, preferably in one or more tube bundles, provide a volume sufficient to allow a residence time in the system to hydrate a polymer. Static mixers may be integrated with a tube bundle. The system may be mounted on a portable base such as a trailer. The concentration of polymer and chemicals in water may be controlled by a controller. A variable speed electric pump or a metering valve may be utilized to precisely control the amount of polymers or other chemicals added to the aqueous liquid.

9 Claims, 5 Drawing Sheets

Related U.S. Application Data continuation-in-part of application No. 12/952,373, filed on Nov. 23, 2010, now abandoned.

(51) Int. Cl.

| | | |
|---|---|---|
| *B01F 15/04* | (2006.01) | |
| *B01F 3/08* | (2006.01) | |
| *B01F 5/06* | (2006.01) | |
| *B01F 13/00* | (2006.01) | |
| *E21B 21/06* | (2006.01) | |
| *B29K 105/00* | (2006.01) | |

(52) U.S. Cl.
CPC .......... *B01F 5/0647* (2013.01); *B01F 13/004* (2013.01); *B01F 15/042* (2013.01); *B01F 15/0429* (2013.01); *E21B 21/062* (2013.01); *B01F 2215/0049* (2013.01); *B29K 2105/0073* (2013.01)

(58) Field of Classification Search
USPC ................................ 366/336–340, 10, 182.2
See application file for complete search history.

(56) References Cited

U.S. PATENT DOCUMENTS

| | | | |
|---|---|---|---|
| 3,838,976 A | | 10/1974 | Bosch |
| 3,933,656 A | | 1/1976 | Reick |
| 4,336,345 A | | 6/1982 | Lewis et al. |
| 4,345,715 A | | 8/1982 | Van Craenenbroeck |
| 4,533,254 A | * | 8/1985 | Cook ............... B01F 5/0256 366/340 |
| 4,641,705 A | * | 2/1987 | Gorman ............ F28F 13/125 366/339 |
| 4,647,050 A | | 3/1987 | Johnson |
| 4,664,528 A | | 5/1987 | Rodgers et al. |
| 4,716,932 A | | 1/1988 | Adams |
| 4,828,034 A | | 5/1989 | Constien et al. |
| 5,002,325 A | | 3/1991 | Fought et al. |
| 5,052,486 A | | 10/1991 | Wilson |
| 5,305,854 A | | 4/1994 | Wheeler |
| 5,388,905 A | * | 2/1995 | Ake ............... B01F 3/0861 366/163.2 |
| 5,494,596 A | | 2/1996 | Law et al. |
| 5,895,116 A | | 4/1999 | Kreinheder et al. |
| 6,237,423 B1 | | 5/2001 | Zey |
| 6,644,844 B2 | | 11/2003 | Neal et al. |
| 7,045,060 B1 | | 5/2006 | Liles |
| 7,048,432 B2 | | 5/2006 | Phillippi et al. |
| 7,108,058 B2 | | 9/2006 | Pippert |
| 7,939,605 B2 | | 5/2011 | Lehmann |
| 2002/0191481 A1 | | 12/2002 | Cox et al. |
| 2002/0196703 A1 | | 12/2002 | Rumph |
| 2004/0085853 A1 | | 5/2004 | Kohlgruber et al. |
| 2008/0264641 A1 | | 10/2008 | Slabaugh et al. |
| 2010/0038100 A1 | | 2/2010 | Schuetzle |
| 2011/0071252 A1 | * | 3/2011 | Prince ................ B29B 7/16 366/142 |
| 2011/0090757 A1 | | 4/2011 | Schauerte et al. |
| 2011/0220354 A1 | * | 9/2011 | Eikaas ............... B01F 3/1271 166/275 |

FOREIGN PATENT DOCUMENTS

| | | |
|---|---|---|
| FR | 2323820 | 4/1977 |
| WO | 0032721 | 6/2000 |
| WO | 2010031804 A2 | 3/2010 |

OTHER PUBLICATIONS

Office Action from Mexican Institute of Industrial Property for Mexican Patent Application No. MX/a/2013/005774 dated Aug. 25, 2015.
Office Action from Chinese IP Office Application No. 201180056805.2 dated Aug. 14, 2015.
International Search Report and Written Opinion for PCT Application No. PCT/US2011/61719 dated Apr. 24, 2012.
Official Action for Russian Application 3013128535 dated Nov. 21, 2014.
Official Action for Chinese Application 201180056805.2 dated Nov. 28, 2014.
Third Office Action for Chinese Patent Application No. 201180056805.2 dated Mar. 2, 2016.
Fourth Office Action for Chinese Patent Application No. 201180056805.2 dated Sep. 26, 2016.

\* cited by examiner

POLYMER BLENDING SYSTEM

This application is a continuation of U.S. application Ser. No. 13/216,329 filed Aug. 24, 2011, which is a continuation-in-part of U.S. application Ser. No. 12/952,373 filed Nov. 23, 2010.

BACKGROUND OF INVENTION

1. Field of the Invention

This invention is directed to method and apparatus for placing water-soluble polymers and other chemicals into water to produce optimum properties of the solution and to obtain data to facilitate the process. More particularly, a portable tube bundle containing static mixers for effective blending without excessive shearing or damage to the polymer and chemical transport and storage apparatus with sensors and a programmable chemical delivery system are provided.

2. Description of Related Art

One purpose of a blending or mixing system as disclosed herein is to allow a water-soluble polymer and other chemicals to be blended from a dispersion in oil into water or an aqueous liquid and to obtain maximum benefits of the polymer. Such a device is commonly called a blending system when used in conjunction with the fluids used in oil and gas wells. It may be used in any application where there is a need to mix polymer or other chemicals in a continuous and a controlled manner. To insure the effective and even distribution of the polymer or other chemicals into the water, the polymer must be wet by the water and thoroughly dispersed such that the polymer does not form clusters or aggregates, often called "fisheyes." The polymer normally requires sufficient agitation and retention time as to allow the polymer chains to unfold, causing the polymer solution to reach its maximum dispersion. With batch mixing, this retention time is accomplished by the use of tanks that have a large enough capacity to allow the mixture proper retention time prior to use. Normally, this is performed through the use of two or more compartmented tanks that allow mixing to occur in one or more tanks while the fluid that has already been mixed in the other tank or tanks is pumped. The size of the tanks used for this type of batch mixing is dependent on the rate that the fluid is being pumped from the system and the total mixing time required for the chemicals being used, but the tanks are expensive to transport and they form a large footprint. One of the major limitations to batch mixing is that conditions may change and a batch may not be needed for pumping into a well. This creates the problem of disposing of the mixed solution.

The amount of fluid used in many oil and gas well completion operations has increased in size. In horizontal wells, higher pump rates generally must be used to perform flow or circulation within the wellbore during completion operations, such as drilling out plugs and removing solids. The polymers that are introduced into the fluid medium help not only to transport the particles but also to reduce the frictional pressure loss as fluid is pumped at higher rates through tubulars in the well bore. It is important that the polymers and any other chemicals added to the fluid be introduced in a controlled operation. Preferably, the composition and properties of the fluid mixed and pumped should be measured and the data preserved, along with additional information on water quality, temperature, viscosity, and density.

Injection rates used in hydraulic fracturing operations have also increased in recent years. Polymer is added to the fluids to decrease friction pressure drop as the fracturing fluid (called "slick water") is injected. Other types of polymers may be used to help suspend proppant in the fluid. In many cases the polymers being used do not have sufficient contact and mixing time prior to being pumped into the wellbore to completely hydrate, thereby limiting the effectiveness of the polymers. This may require overdosing of chemicals to achieve the desired results.

In some cases larger tanks with recirculation pumps have been incorporated into the completion and fracturing operations in an effort to improve the mixing and retention time of polymers. However, the recirculation pumps may lead to excessive shear of polymers, which can break the long chains of the polymers that are being mixed, resulting in lower effectiveness of the polymer solution.

U.S. Pat. No. 7,048,432 discloses a method and apparatus for hydrating a polymer for use in wells. The polymer solution is directed through a housing containing rotating impellers. U.S. Pat No. 4,828,034 discloses mixing a polymer into an oil-based fluid to form an oil-based polymer concentrate, then injecting the oil-based slurry into a water stream and pumping the mixture through a high-shear pump and a static mixer into a first holding tank, then pumping the liquid through a second high-shear pump into a second holding tank. U.S. Pat No. 4,336,345 discloses formation of a polymer concentrate containing an inhibitor to hydration, then reversing the inhibitor reaction to allow full hydration of the polymer.

What is needed is a blending system that overcomes the lack of retention time, excess shearing of the solution, the complexity of batch and continuous operations disclosed above and that can maintain a steady pump and mixing rate at an economical cost.

BRIEF SUMMARY OF THE INVENTION

The method and apparatus disclosed herein eliminate the need for batch mixing and multiple retention tanks for polymer mixing. In-line static mixers agitate and mix polymer in water as it is being pumped through the system. The static mixers generate gentle agitation, allowing the polymer to be thoroughly mixed in the aqueous solution without damaging the polymer by excessive shearing. The invention also provides improved retention or contact time between the aqueous solution and the polymer by providing stable flow of the solution through tubes. The tubes may be in a tube bundle. The system may operate with a programmed control system for chemical injection, thereby reducing the number of personnel required to perform the mixing operation, may be portable for transport to well sites, and may record data indicating composition and properties of the fluids blended.

BRIEF DESCRIPTION OF THE SEVERAL VIEWS OF THE DRAWING(S)

DETAILED DESCRIPTION OF THE INVENTION

Figure 1:
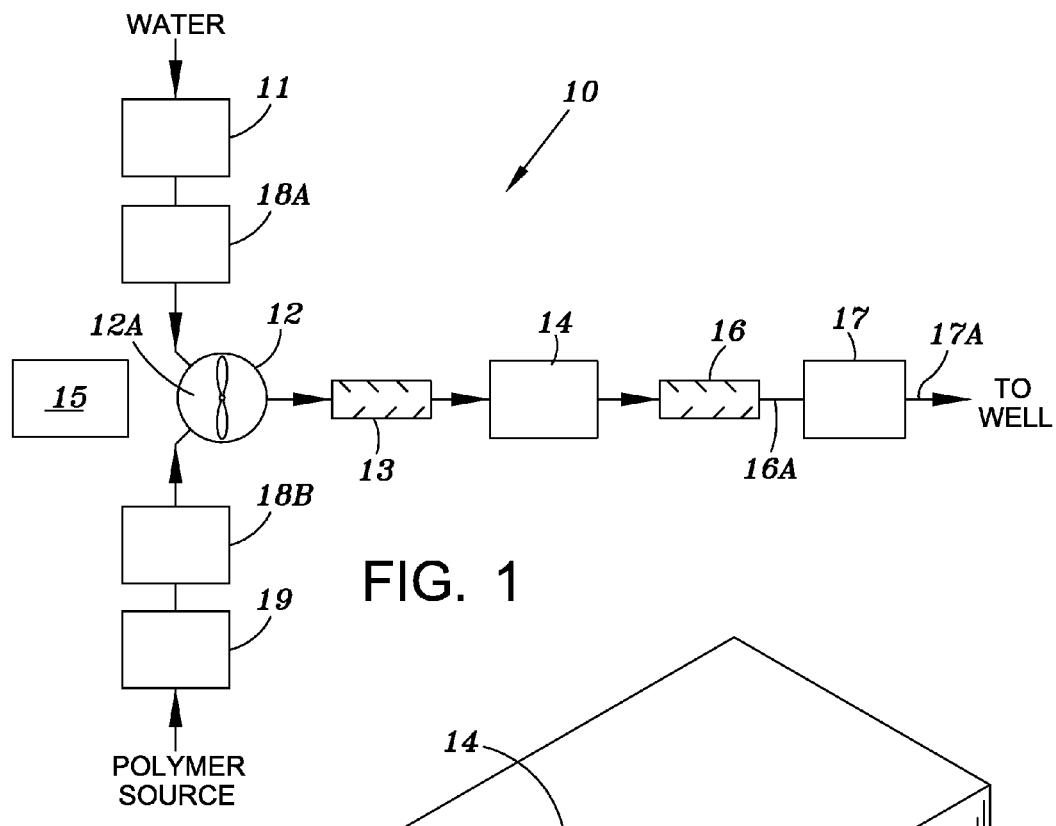
FIG. 1 is a sketch of an embodiment of apparatus for continuous in-line hydration of polymer and apparatus for sensing and recording data.

Referring to FIG. 1, blending system 10 may intake water or an aqueous liquid into pump 11, which pumps the liquid through water flow meter 18A to connection 12, where a second liquid stream is added to the water. Connection 12 may contain sensors 12A, which may be used to measure temperature, salinity, surfactant or other chemical composition and any other variable that is relevant to the properties or effectiveness of the blended liquid. Sensors 12A are connected to controller 15. Pump 11 is necessary only if water pressure is not sufficient. The liquid may then go to static mixer 13 (as shown) or directly to tube bundle 14. Static mixers 13 and 16 may be arranged to receive liquid before or after tube bundle 14. Line 16A carries the blended liquid to pump 17. Polymer or other chemical is added to the water stream at connection 12 in the form of a concentrated suspension or solution in the second liquid, normally oil. Flow meter 18A measures the rate of water flow and flow meter 18B measures the rate of oil flow. Both flow meters send a signal to controller 15. Metering valve 19 controls rate of flow of the oil stream according to a pre-programmed signal from controller 15 to supply a desired concentration of chemical in the stream exiting connection 12. Such controllers and valves are well known in industry. Solenoid valves such as manufactured by Sun Hydraulics, for example, may be used as valve 19 to control fluid flow rate based on electrical control signals that shift a spool or cartridge. Controller 15 may be manually changed during use or respond to signals from a sensor.

System 10 requires very little energy to operate and may use pressure of the water source. Alternatively, pump 11 may be necessary. In-line mixing allows a higher range of flow rates to be used without reducing the effectiveness of the polymer being mixed by applying excessive shear rate to the solution.

Figure 2:
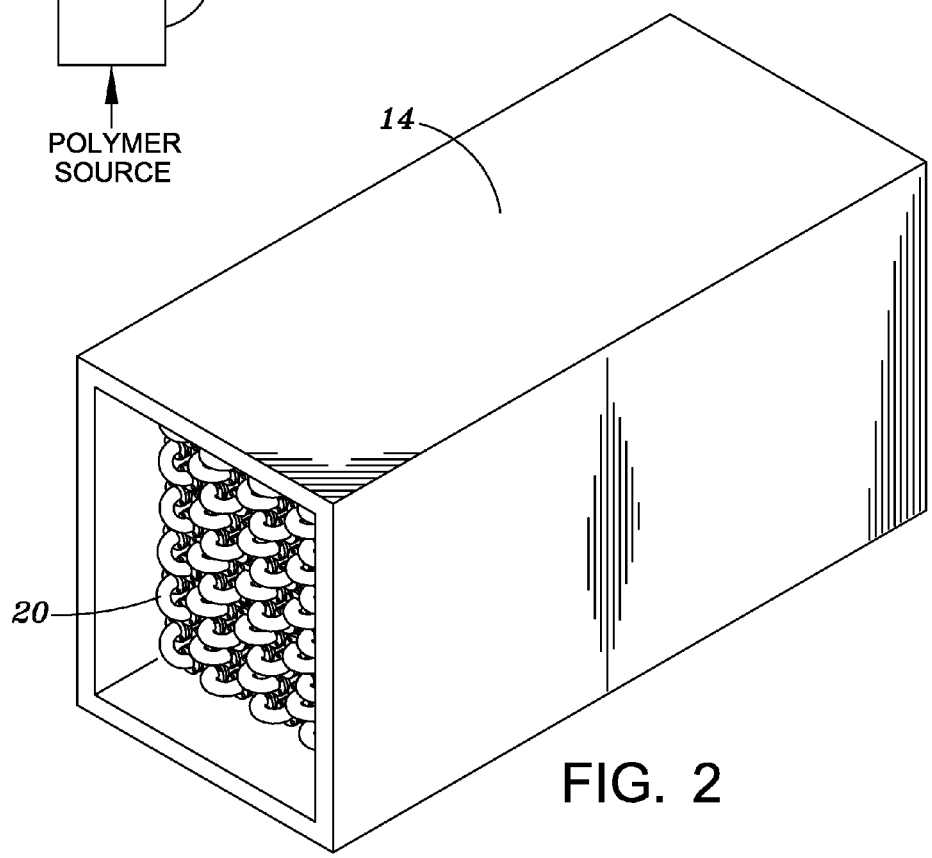
FIG. 2 is a drawing of a tube bundle in a case as disclosed herein.
Figure 3:
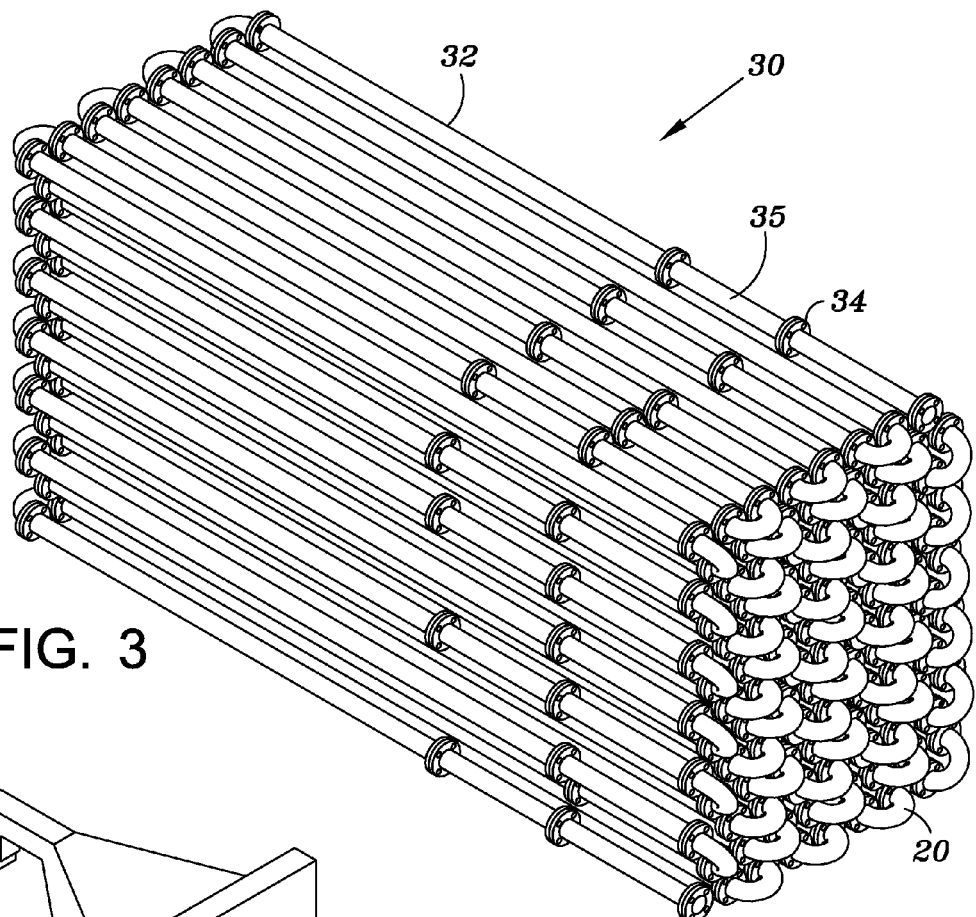
FIG. 3 is an isometric view of tubes and static mixers in a tube bundle.

System 10 preferably uses a continuous length of pipe or tube that is tightly compacted to reduce the size of the overall package (a "tube bundle"), such as illustrated in FIG. 2 and FIG. 3. Tube bundle 30 (FIG. 3) includes straight tubes 32 that may be placed parallel and connected with curved ends 20. A selected number of straight tubes 32 may include a segment containing static mixer 35. Static mixer 35 may be joined in a straight tube by flange 34, by a weld or by any other method for joining tubes. The length and diameter of the tubes allows sufficient contact time to allow the aqueous solution to become properly hydrated. The tube bundle may incorporate inline static mixers positioned throughout the length of the assembly to gently agitate the solution during pumping and to insure complete and thorough mixing of the solution. A suitable static mixer is a "Kenics" mixer available from Chemineer, Inc. of North Andover, Mass. The entire tube bundle may be enclosed in box 14 (FIG. 2), which may have insulated walls.

The tube bundle may be positioned in vertical, horizontal or inclined position. The tubes and connectors may be made of ferrous or non-ferrous material, including plastics or rubber hosing or any combination. The tubes must have sufficient diameter and length to provide a proper retention time. The tubes may have a diameter from 2 inches to 6 inches and a total length from about 100 feet to whatever length is necessary to achieve the needed retention time. The volume of tubes should be sufficient to provide proper retention time of the liquid in system 10. A plurality of tube bundles may be used in the system. They may be connected in series or in parallel. The combination of directional change in tube bundles, combined with the inline static mixers, generates effective and thorough agitation and mixing of the polymer in the aqueous solution. The directional changes further reduce the amount of time required for mixing without damaging the polymer molecules. In one embodiment the volume of tubes and static mixers is selected to allow a retention time of 20 minutes at a pump rate of 100 gallons per minute. This contact time is defined as from the time the aqueous liquid and polymer is introduced into connection 12 until the time the solution leaves the system through outlet conduit 17A.

Figure 4:
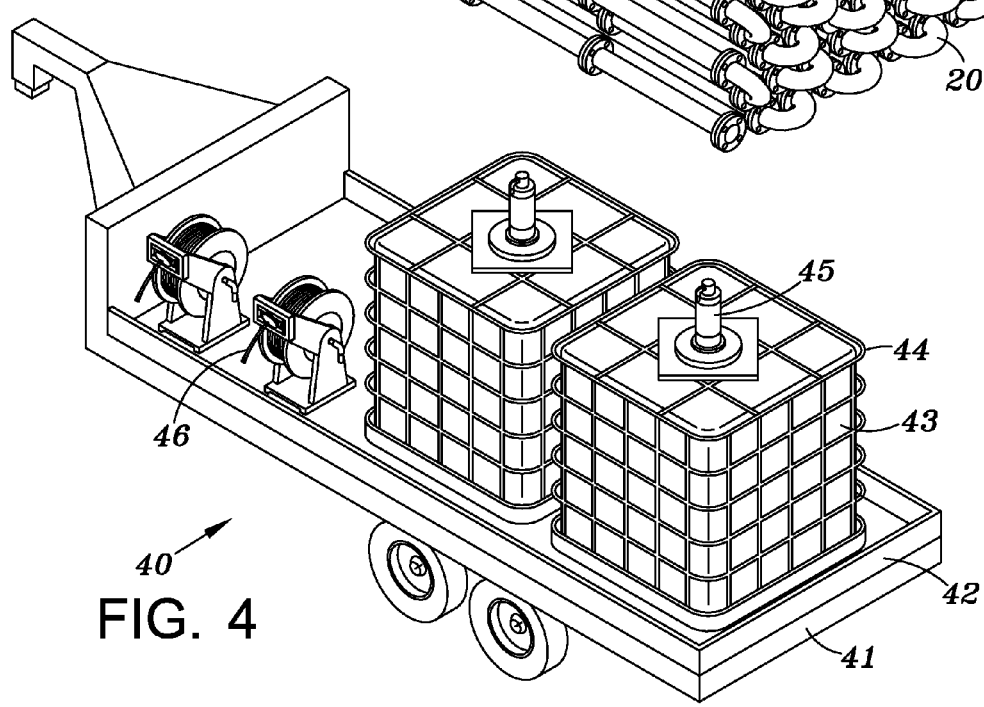
FIG. 4 is an isometric view of a portable blending system as disclosed herein.

In a different embodiment using tube bundles, the system may be assembled as a mobile unit that is small and light-weight and that can be transported on a trailer. A trailer such as shown in FIG. 4 may be used to transport tube bundles or, as shown in the figure, may be used to transport portable polymer system 40, or both. Multiple tube bundles may be mounted on a trailer and connected in series or in parallel to provide greater capacity. The bed of the trailer may be storage tank 41, which serves as a spill-containment vessel. Vessel 41 is preferably sized to contain the volume of liquid to be transported in system 40. Barrier 42 forms a leak-free spill structure that encloses liquid tanks 43. It is a very important feature of the trailer that the trailer has built-in capacity in tank 41 to hold the contents of the tanks 43. Tanks 43 may hold a suspension of polymer in oil, such as available in industry from chemical suppliers, and other chemicals. Tanks 43 may be made from polymer and require rods 44 to prevent excessive deformation when the tanks are full of liquid. Liquid may be pulled from tanks by pneumatic-operated piston pump 45. Hose and reel 46 can be used for air supply to operate pumps 45. The polymer concentrate may be pumped through a hose (not shown) to metering valve 19 (FIG. 1). Pumps 45 may incorporate an inline air regulator to control the pressure between the pneumatic pump and metering valve 19. This allows constant pressure to be supplied to the metering valve as the valve opens and closes due to changes in the flow rate of the incoming liquid and provides great flexibility for a wide range of pump rates without affecting the mix ratios. In one embodiment, positive pressure chemical injection pump 45 may have programmable logic from controller 15 that allows the injection of the chemicals to be maintained at a constant ratio based on the input or pump rate of the incoming aqueous liquid measured at flow meter 18 and also allows pump 45 to respond to selected variables such as temperature, pressure, salt composition in water, and any other measurable quantity that may be selected to control chemical injection rate. In another embodiment, the rate of chemical injection is programmed using valve 19 to control flow rate, which may respond to selected variables, such as temperature, pressure, salt composition in water, and any other measurable quantity that may be selected to control chemical injection rate. Tube bundles such as shown in FIG. 2 may, alternatively, be installed on the same trailer as tanks 43.

Referring to FIG. 1, downstream of the blending and data acquisition system is normally high-pressure pump 17, which may have pressure gauge 17A at the output of the pump. Data indicating pressure at this point is preferably sent to controller 15, where it may be recorded and later used to analyze the effects of blending operations on pressure at the wellhead as fluid is injected.

Figure 5:
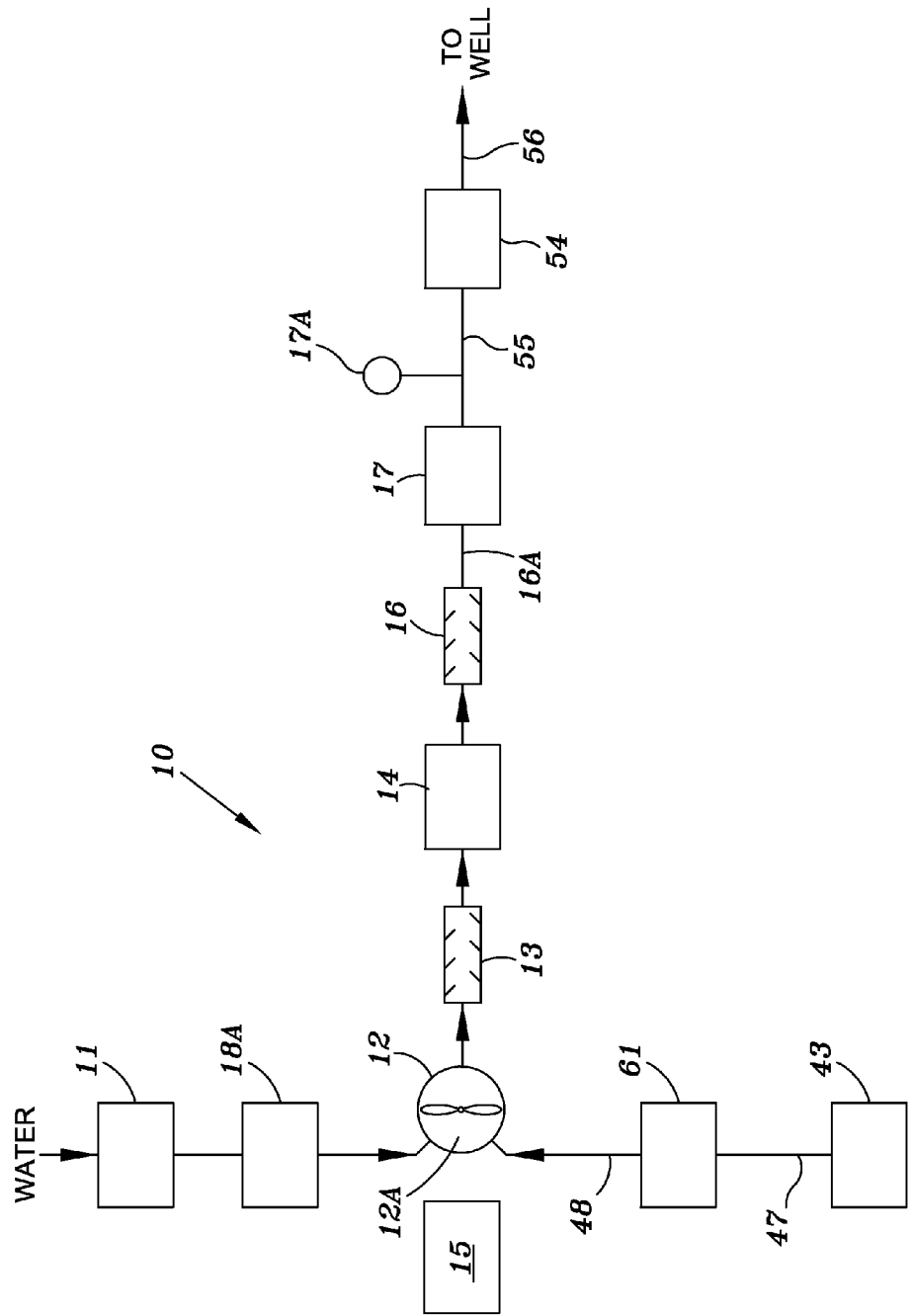
FIG. 5 is a sketch of a second embodiment of apparatus for continuous in-line hydration of polymer and apparatus for sensing and recording data.

FIG. 5 illustrates a second embodiment of the blending system 10. The system includes components similar to those in the embodiment of FIG. 1 including liquid pump 11, flow meter 18A and connection 12 which may include sensors 12A. A source 43 of polymer or other chemical in the form of a concentrated suspension or solution is connected via conduit 47 to a variable speed electric pump 61. A check valve 62 is positioned in the flow line between source 43 and pump 61. Conduit 48 directs the polymer or other chemical into connection 12 as in the embodiment of FIG. 1. The mixture leaves connection 12 into for example, a mixer 13, tube bundle 14, mixer 16 and pump 17 which may include a pressure sensor 17A. Various combinations and locations of the mixers and tube bundle may be utilized. From pump 17 the mixture is directed to the well via conduits 55, 56. A coriolis mass flow meter 54 may be utilized to measure the mass flow rate. Pressure and mass flow rate data is sent to the controller 15 where it is stored and can be analyzed along with other information from sensors 12A and flow meter 18A.

The amount of fluid from source 43 can be precisely controlled by operation of the variable speed electric pump 61. Flow meter 18a measures the rate of water flow and sends a signal to the control 15. In-line check valve 62 prevents water pressure and flow from entering into the chemical or oil injection conduit 48. Controller 15 calculates the chemical volume required to meet the programed dosage volume or oil injection volume. It sends a signal to the variable speed motor and calculates the Hertz value for the motor rotation speed to match the desired volumetric outputs. The motor sends a signal back to the controller to verify that motor rotation has reached the pre-set chemical dosage requirements.

Figure 6:
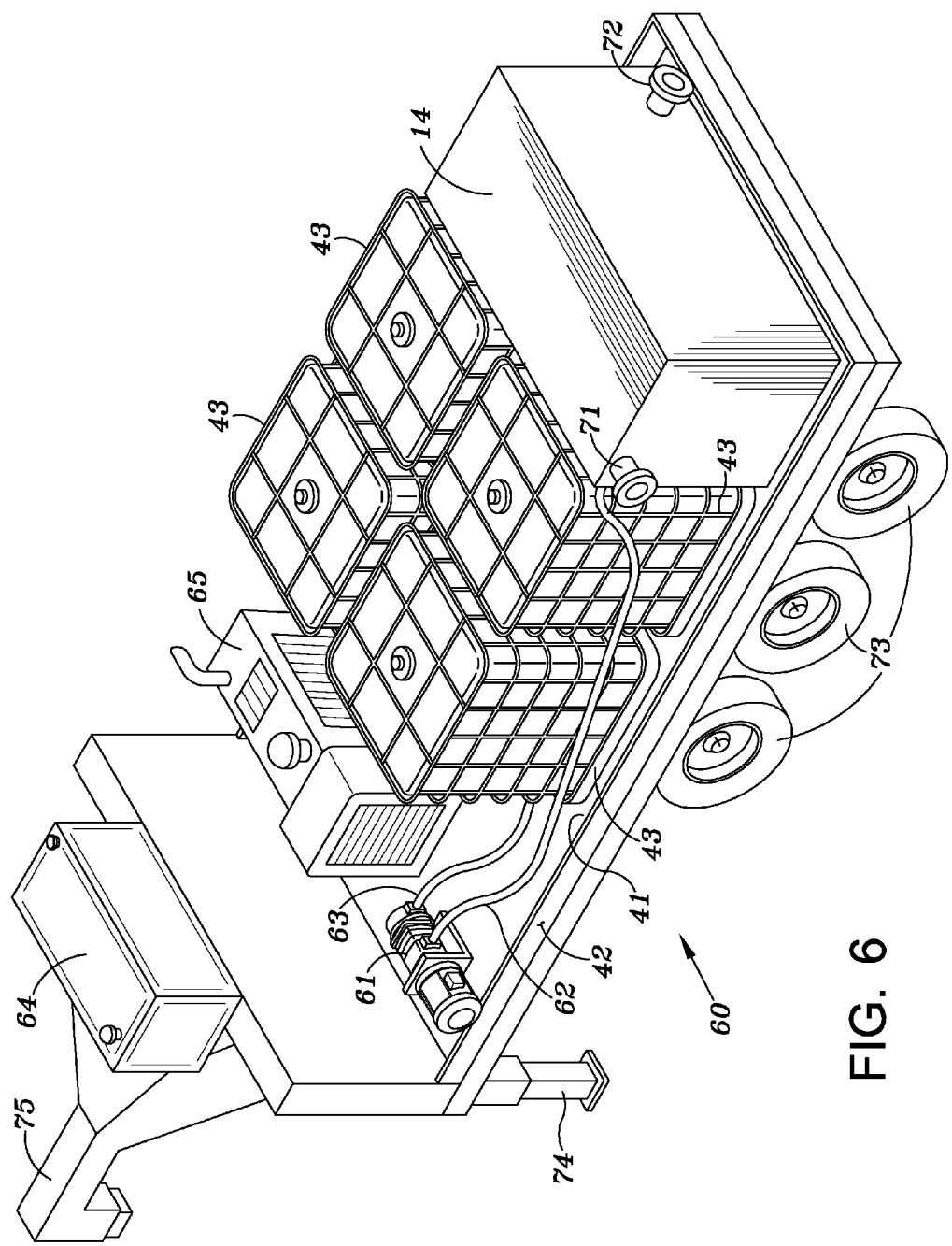
FIG. 6 is an isometric view of a second embodiment of a portable blending system as disclosed herein.

FIG. 6 shows an embodiment of a portable system for the embodiment of FIG. 5 that can be transported on a trailer. The portable system includes a trailer 60 having wheels 73 and adjustable ground supports 74 to support the trailer when it is not being towed. Upper frame member 75 leads to a goose neck type connector. As in the embodiment of FIG. 3, the bed of the trailer may include a storage tank 41 which serves as a spill-containment vessel. Tanks 43 for chemicals are supported on bed 41. A variable speed electric pump 61 is mounted on the trailer bed and includes an inlet conduit 63 and an outlet conduit 62 which delivers the chemical to a connector located within tube bundle housing 14. Electrical power for the pump 61 is provided by a diesel generator 65. A storage tank 64 for diesel fuel is mounted on upper frame member 75. An inlet 71 is provided delivering water to the connector within the bundle housing 14 and an outlet 72 for the mixed fluids is located at a suitable location on the bundle housing 14. A bundle 30 such as shown in in FIG. 3. is positioned within bundle housing 14. Controller 15 and sensors 17A and 18A and meter 54 can be located on the structure at any convenient location. The trailer may be covered by a suitable enclosure not show having door panels in the sides for easy access.

Figure 7:
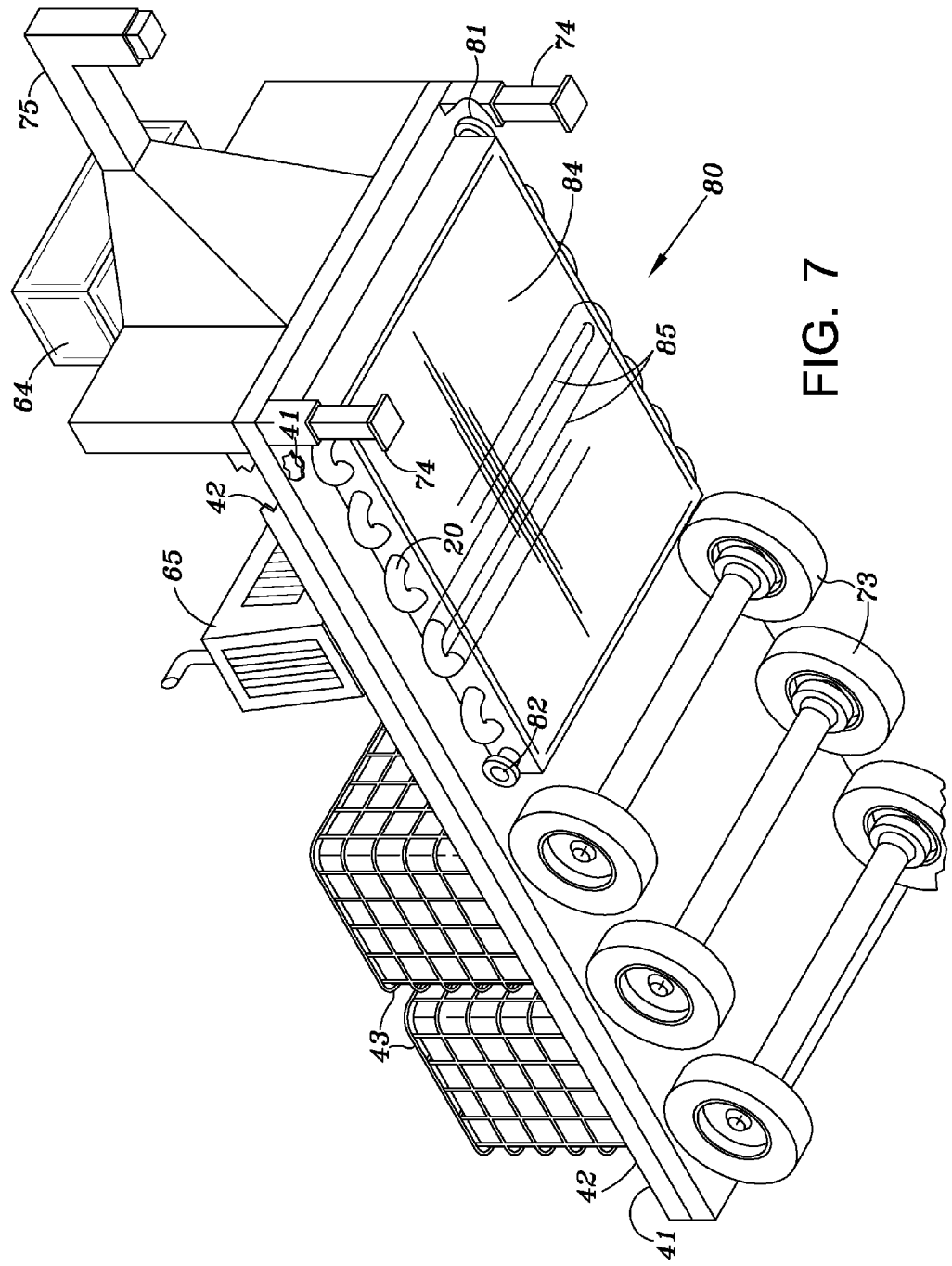
FIG. 7 is an isometric view of another embodiment of a portable blending system as disclosed herein.

FIG. 7 illustrates yet another embodiment of the system arranged on a trailer 80. This embodiment is similar to that of FIG. 6. However in the embodiment of FIG. 7 the tube bundle 30 shown in FIG. 3 is located on the lower part of the trailer below or in the spill containment vessel 41, for example. This eliminates hydrostatic pressure from the upper position which allows the water to freely flow through the tubes without assistance of additional pumps. Bundle 30 in this embodiment includes a plurality of straight pipe sections 85 connected together by elbow sections 20. The straight pipe sections and the elbows are generally located in a single plane that is parallel to the horizontal plane of the truck bed or vessel 41. The bundle 30 includes an inlet 82 and outlet 81 for the fluid being treated as well as inlets for the chemical(s) being added to the fluid. The bundle 30 may also include static mixers 35 as shown in FIG. 3 and can be attached to the underside of vessel 41 by any suitable means.

Although the present invention has been described with respect to specific details, it is not intended that such details should be regarded as limitations on the scope of the invention, except to the extent that they are included in the accompanying claims. Modifications to the invention may be made as might occur to one skilled in the field of the invention within the scope of the appended claims. All embodiments contemplated hereunder that achieve the objects of the invention have not been shown in complete detail. Other embodiments may be developed without departing from the spirit of the invention or from the scope of the appended claims.

I claim:

1. A system for blending polymers to form a polymer solution in water, comprising:
   a water flow meter for connection to a source of water;
   a connection for adding a suspension of polymer in oil to the water, the connection having an input for connection to a source of water;
   a tube bundle connected to the connection and comprising a plurality of sections of tubes and static mixers;
   a polymer in oil flow meter for connection to a source of polymer in oil;
   the connection having a second input for the polymer in oil;
   means for controlling the flow rate of polymer in oil;
   a controller for sending signals to the means for controlling the flow rate of polymer in oil to control the flow rate of the polymer in oil in response to signals received from the water flow meter and the polymer in oil flow meter and an additional static mixer outside the tube bundle and connected to the tube bundle.

2. The system of claim 1 further comprising a pump connected to the source of water.

3. The system of claim 1 wherein a volume of the tube bundle is selected to provide a selected residence time of fluid flowing through said tube bundle at a selected flow rate.

4. The system of claim 1 wherein the tube bundle is enclosed in a heat-insulated box.

5. The system of claim 1 further comprising a sensor for sending temperature and chemical composition signals to the controller.

6. A system for blending polymers to form a polymer solution in water, comprising:
   a water flow meter for connection to a source of water;
   a connection for adding a suspension of polymer in oil to the water, the connection having an input for connection to a source of water;
   a tube bundle connected to the connection and comprising a plurality of sections of tubes and static mixers;
   a polymer in oil flow meter for connection to a source of polymer in oil;
   the connection having a second input for the polymer in oil;
   means for controlling the flow rate of polymer in oil; and
   a controller for sending signals to the means for controlling the flow rate of polymer in oil to control the flow rate of the polymer in oil in response to signals received from the water flow meter and the polymer in oil flow meter and a high-pressure pump connected to the tube bundle and having a discharge pressure sensor wherein a pressure signal is sent to the controller from the pressure sensor on the output of the high-pressure pump.

7. The system of claim 6 further comprising a mass flow meter connected to the output of the high pressure pump.

8. The system of claim 1 further including a source of water connected to the connection.

9. The system of claim 1 wherein the means for controlling the flow rate of polymer is oil comprises a metering valve.

* * * * *